United States Patent
Jang

(10) Patent No.: US 8,442,694 B2
(45) Date of Patent: May 14, 2013

(54) DISTRIBUTION OF AIRFLOW IN AN HVAC SYSTEM TO OPTIMIZE ENERGY EFFICIENCY AND TEMPERATURE DIFFERENTIALS

(75) Inventor: Youngjo Jang, Changwon-si (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 12/842,365

(22) Filed: Jul. 23, 2010

(65) Prior Publication Data

US 2012/0022702 A1    Jan. 26, 2012

(51) Int. Cl.
*G05D 23/00* (2006.01)
*G05B 13/00* (2006.01)
*G05B 15/00* (2006.01)
*G01M 1/38* (2006.01)

(52) U.S. Cl.
USPC .......... 700/276; 700/277; 700/300; 700/282; 236/47; 236/49.3; 454/232; 454/239; 454/256; 454/258; 454/284

(58) Field of Classification Search .......... 700/276, 700/277
See application file for complete search history.

(56) References Cited

U.S. PATENT DOCUMENTS

| | | | | |
|---|---|---|---|---|
| 4,649,709 | A * | 3/1987 | Kagohata et al. | 62/89 |
| 5,170,935 | A * | 12/1992 | Federspiel et al. | 700/276 |
| 5,931,001 | A * | 8/1999 | Watanabe et al. | 62/3.7 |
| 6,250,560 | B1 * | 6/2001 | Kline et al. | 236/49.3 |
| 6,581,847 | B2 * | 6/2003 | Kline et al. | 236/49.3 |
| 7,392,661 | B2 * | 7/2008 | Alles | 700/291 |
| 7,832,465 | B2 * | 11/2010 | Zou et al. | 700/278 |
| 8,147,302 | B2 * | 4/2012 | Desrochers et al. | 700/267 |
| 2001/0042792 | A1 * | 11/2001 | Kline et al. | 236/49.3 |
| 2002/0134849 | A1 * | 9/2002 | Disser | 236/47 |
| 2004/0238653 | A1 * | 12/2004 | Alles | 236/49.3 |
| 2005/0034467 | A1 * | 2/2005 | Varney | 62/178 |
| 2005/0087613 | A1 * | 4/2005 | Trecate | 236/49.1 |
| 2005/0175944 | A1 * | 8/2005 | Ahmady | 431/18 |
| 2005/0194455 | A1 * | 9/2005 | Alles | 236/1 B |
| 2006/0097063 | A1 * | 5/2006 | Zeevi | 236/49.3 |
| 2006/0117769 | A1 * | 6/2006 | Helt et al. | 236/49.3 |
| 2006/0234621 | A1 * | 10/2006 | Desrochers et al. | 454/239 |
| 2007/0045431 | A1 * | 3/2007 | Chapman et al. | 236/46 C |
| 2007/0178823 | A1 * | 8/2007 | Aronstam et al. | 454/256 |
| 2008/0014857 | A1 * | 1/2008 | Spadafora et al. | 454/229 |
| 2008/0277486 | A1 * | 11/2008 | Seem et al. | 236/49.3 |
| 2009/0277603 | A1 * | 11/2009 | Yang | 165/45 |

(Continued)

OTHER PUBLICATIONS

ASHRAE, "ASHRAE Standard: Ventilation for Acceptable Indoor Air Quality", Jun. 2003, American Society of Heating, Refridgeration and Air-Condition Engineers, Inc., ISSN: 1041-2336.*

(Continued)

*Primary Examiner* — Mohammad Ali
*Assistant Examiner* — Kelvin Booker
(74) *Attorney, Agent, or Firm* — Ked & Associates, LLP

(57) ABSTRACT

An air conditioner and a method of controlling the same are disclosed herein. The method of controlling the air conditioner includes receiving an electric power rate information, and distributing an internal air from a first indoor room to a second indoor room to reduce a temperature difference between a plurality of indoor rooms. During periods of peak power rates, costs associated with operating the air conditioner may be reduced by limiting operation of the indoor and outdoor units, while adjusting the temperatures of the indoor rooms by distributing air among the plurality of the indoor rooms.

21 Claims, 13 Drawing Sheets

U.S. PATENT DOCUMENTS

| | | | |
|---|---|---|---|
| 2010/0163633 A1* | 7/2010 | Barrett et al. | 700/278 |
| 2011/0031322 A1* | 2/2011 | Zou et al. | 236/1 B |
| 2011/0172828 A1* | 7/2011 | Schmidt et al. | 700/276 |
| 2012/0071082 A1* | 3/2012 | Karamanos | 454/284 |

OTHER PUBLICATIONS

Cox, R., "Efficient Design of Heating, Ventilation and Air-Conditioning Systems for Healthcare Facilities", 2004, Business Briefing in Hospital Engineering and Facilites Management.*

Johnson, G.R., "HVAC Design for Sustainable Laboratory", Sep. 2008, ASHRAE Journal, vol. 50.*

Padfield, T. and Larsen, P.K., "Low Energy Air-Condition of Archives", Nov. 2006, Retrieved from the Internet on May 17, 2012 at "http://www.conservationphysics.org/arnemag/arnemag-nrwch.pdf".*

Robertson, J.A.; Brown, R.E.; Koomey, J.G.; and Greenberg, S.E., "Recommended Ventilation Strategies for Energy Efficient Production Homes", Dec. 1998, Ernest Orlando Lawrence Berkeley National Laboratory, U.C. Berkeley, Environmental Energy Technology Division.*

* cited by examiner

DISTRIBUTION OF AIRFLOW IN AN HVAC SYSTEM TO OPTIMIZE ENERGY EFFICIENCY AND TEMPERATURE DIFFERENTIALS

BACKGROUND

1. Field

An air conditioner and a method of controlling the same are disclosed herein.

2. Background

Air conditioners and methods of controlling the same are known. However, they suffer from various disadvantages.

BRIEF DESCRIPTION OF THE DRAWINGS

The embodiments will be described in detail with reference to the following drawings in which like reference numerals refer to like elements, and wherein.

DETAILED DESCRIPTION

An air conditioner and a method of controlling the same are broadly disclosed and embodied herein. The air conditioner may be installed in a plurality of indoor rooms, and may implement temperature adjustment and ventilation. Further, the air conditioner may control power consumption according to a level of a power rate.

The power required to operate home electric appliances or office electric appliances may be supplied by an electric power station, for example, those managed by Korea Power Electric Corporation, through transmission lines to homes or office buildings or other appropriate consumer locations. An electric power grid may have a center generation configuration that includes a radial type structure, as opposed to a distributed generation configuration. Also, the electric power grid may be one-way, supplier oriented as opposed to being consumer oriented. Power generation technology may be analog or electromechanical that requires manual restoration after failures. Necessary equipment may also require manual maintenance and installation.

Further, power rate information may not be available in real-time to the consumer, although they may have limited access to this information from a power exchange. As power rate systems may substantially be a fixed price system, incentives to consumers using rate changes may be difficult to implement.

A smart grid may combine modern electric power technology with information technology. As described previously, an electric power network may be a center-based and center-integrated network controlled by a supplier in a vertical fashion. In contrast, a smart grid may be less integrated by the supplier. For example, a smart grid may be controlled in a horizontal fashion in a collaborative and distributive network that allows communication between the consumer and supplier.

In a smart grid, electric appliances, power storage devices, and distributed electric power suppliers may be connected to a network that allows communication between the consumer and the power supplier. Therefore, the smart grid may be referred to as an "Energy Internet." To supply electricity over a smart grid to a consumer location, such as a home or office building, data regarding electric power information may be provided over two-way communications between the consumer appliances and the electric power supplier. Accordingly, devices or appliances on a smart network no longer simply receive electric power, but may be configured to communicate with the power supplier as well as other devices on the network.

Figure 1:
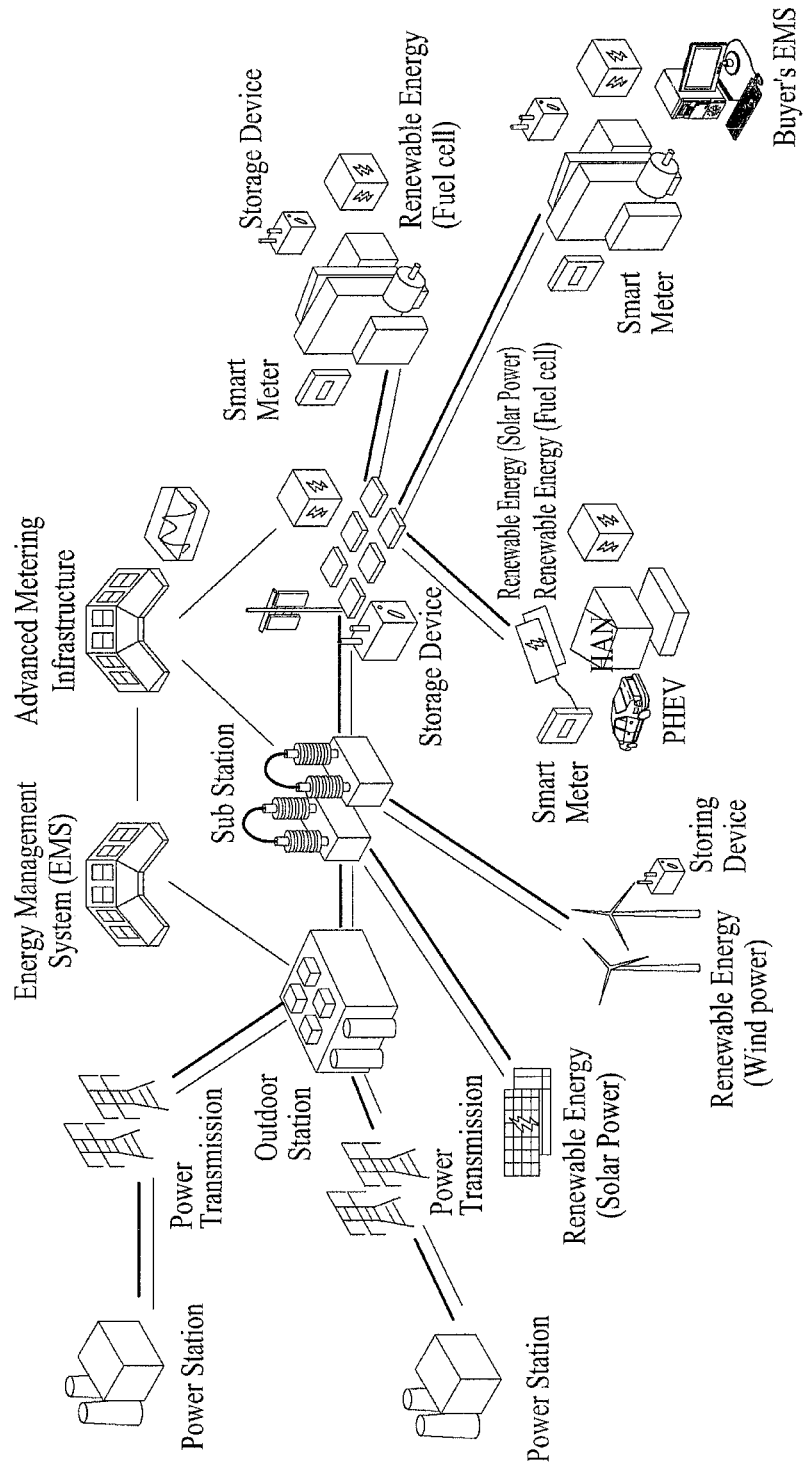
FIG. 1 is a schematic diagram of a smart grid.

FIG. 1 is a schematic diagram of a smart grid. The smart grid may include a power station that generates electricity. The power station may include a nuclear power plant or hydroelectric power plant, as well as renewable energy sources, for example, solar power and wind power.

Electricity generated by the nuclear or hydroelectric power plant may be transmitted to an outdoor station via power cables. The outdoor station may then transmit the electricity to a substation that may distribute the electricity to the consumer locations, for example, homes and office buildings.

The electricity generated by renewable energy may also be transmitted to the substation that distributes the electricity to the consumer location. During transmission to the consumer, the electricity may be stored in an electric power storage device. Further, consumers using a Home Area Network (HAN) may generate and supply electricity using solar power or a fuel cell mounted in a Plug in Hybrid Electric Vehicle (PGEV). Any unused electricity may be stored for future use or sold to others.

A smart metering infrastructure may allow consumers to monitor their electric power consumption and receive information regarding power rates. Based on this information, consumers may take measures to reduce their power consumption and related costs.

Further, as described previously, the power station, outdoor station, storage device and consumer locations may be capable of duplex transmission. As a result, as opposed to when electricity is unilaterally transmitted to the consumer, the consumer may communicate their power needs to the electric power storage device, outdoor station, and/or power stations to receive customized electrical power. In this way, a more efficient power generation and distribution may be possible.

An Energy Management System (EMS) may provide real-time electric power management and power consumption forecasts. An Advanced Metering Infrastructure (AMI) may provide real-time metering of power consumption. The information provided by the EMS and AMI may be used by the smart grid to enhance the usage of power within the smart grid.

Here, the AMI in the smart grid may integrate consumers based on an open architecture. AMI may allow the consumer to increase the efficiency of their power usage and may allow the electric power suppliers to efficiently manage the system by detecting faults in the system. The open architecture may allow various types of electric appliances from different manufacturers to be interconnected on the smart grid. As a result, the metering infrastructure used in the smart grid may make possible consumer friendly ways to improve efficiency of power usage, for example, by providing prices to devices.

For example, a real-time price quote based on market rates may be delivered to the consumer via the EMS installed in each home. The EMS may communicate with each of the electric appliances to control the devices based on the received information. The EMS may also provide electric power information associated with each electric appliance to the user. The user may then implement an electric power information process to manage power consumption or to set power rate limits based on the received power information.

The EMS may include a local EMS provided at consumer locations and a central EMS that processes information acquired by the local EMS. The real-time communication of electric power information between the supplier and consumer in the smart grid may allow real-time grid responses that reduces high costs during periods of peak demand.

Figure 2:
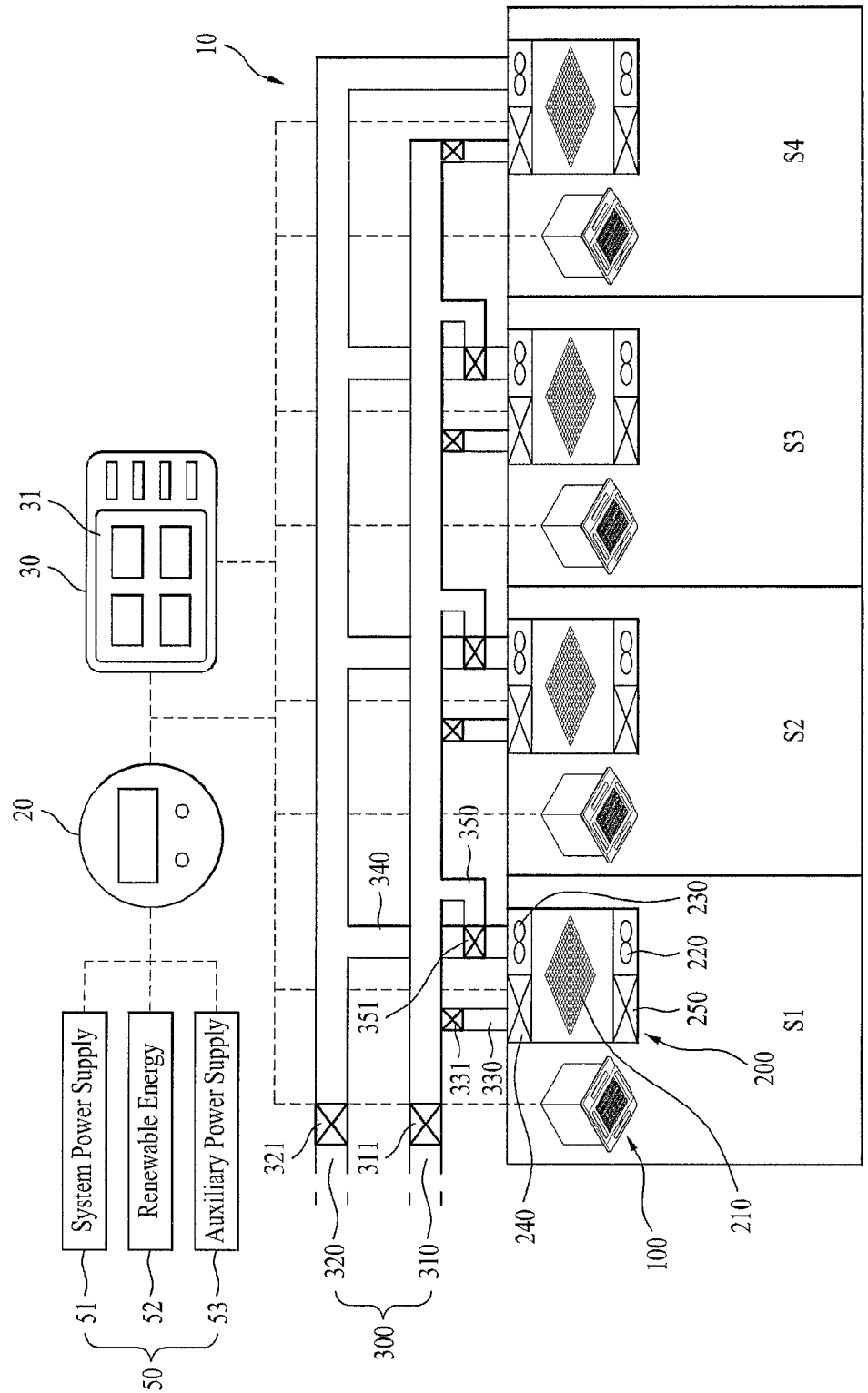
FIG. 2 is a schematic diagram of an air conditioner according to an embodiment.

FIG. 2 is a schematic diagram of an air conditioner installed in a building. The air conditioner 10 may be connected to a smart grid and controlled to operate in response to real-time power rate information. The air conditioner 10 may include a smart meter 20 that measures the electric power usage at consumer locations. The smart meter 20 may also receive power information in real-time. The smart meter 20 may provide the real-time power information, including power rates, to an EMS 30. The EMS 30 may be in communication with one or more indoor units, outdoor units, and ventilation devices to control an operation of the air conditioner.

The EMS 30 may also include a display 31 that displays various information, for example, current electric power consumption or external temperature and humidity, or other appropriate information. The EMS 30 may also store user preferences for the indoor unit of each of the indoor rooms S1-S4. For example, a user or administrator may store a smart grid function setting, user set temperature, humidity level, $CO_2$ level, or the like. The EMS may be a terminal including a button type input interface, touch screen, or another appropriate input interface that receives user input.

The EMS 30 may be connected with indoor units 100 and ventilation devices 200 which may be installed in a plurality of indoor rooms S1-S4 via a network provided in the building. The EMS 30 may control the various devices of the air conditioner 10 through two-way communications over the network. The communication network inside the building may be a wired or wireless network, for example, a powerline communications (PLC) network.

Each of the various devices of the air conditioner 10 may be interconnected to communicate with each other. For example, an indoor unit 100 and a ventilation device 200 provided in one indoor room may be connected through the network to communicate with a second indoor room that includes another indoor unit 100 and another ventilation device 200.

Here, an electric power supply source 50 of the building may include a system power supply 51, a renewable energy supply 52, and/or a renewable energy supply 52. The system power supply 51 may supply electric power from an electric power company, for example, a conventional power generation facility for thermal, nuclear or hydroelectric power. The renewable energy supply 52 may include wind or solar power generation. The auxiliary power supply 53 may include a fuel cell provided in the building that provides auxiliary electric power. The electric power supply source 50 may be connected to the smart meter 20 and the EMS 30 and may supply power information to the smart meter 20 and EMS 30. The received power information may be used to control the air conditioner 10.

The indoor unit 100 may be provided in each of the indoor rooms S1-S4 and configured to adjust the temperature of the indoor rooms S1-S4 through heat-exchange using a refrigerant. The ventilation device 200 may be configured to exchange external, ambient air with internal air of the indoor rooms S1-S4. Ventilation of the indoor rooms may improve air quality or a comfort sensation of the air, for example, by adjusting a humidity or $CO_2$ levels in the indoor rooms. The ventilation device 200 may also be configured to move air between the indoor rooms S1-S4. For example, treated air from a first indoor room S1 may be moved to a second indoor room S2 to treat the air in the second indoor room S2.

An air duct 300 may be provided in the building that interconnects the ventilation device 200 of the indoor rooms S1-S4. The air duct may include a first air duct 310 configured to guide external air toward the indoor rooms S1-S4 and a second air duct 320 configured to guide internal air from each of the indoor rooms S1-S4 to the outside. A supply duct 330 may be provided that connects the first air duct 310 to each of the ventilation devices 200 to guide the external air to the respective indoor rooms S1-S4.

An inlet adjusting device or inlet damper 311 may be provided at an inlet end of the first air duct 310 to selectively close the inlet to prevent a flow of external air. A supply adjusting device 331 may be provided in the supply duct 330 that selectively opens or closes the supply duct 330 to the first air duct 310.

An exhaustion duct 340 may be provided between the second air duct 320 and each of the ventilation devices 200 that guides the air exhausted from the ventilation device 200 toward the second air duct 320. A connection duct 350 may connect the exhaustion duct 340 to the first air duct 310. An outlet adjusting device or outlet damper 321 may be provided at an outlet end of the second air duct 320 to selectively close the outlet to prevent a flow of internal air to the outside.

An air path changing duct 351 may be provided between the exhaustion duct 340 and the connection duct 350 that directs the air exhausted from the ventilation device 200 toward either the first air duct 310 or the second air duct 320. The air path changing device 351 may not only guide the air exhausted from the ventilation device 200 toward either the first air duct 310 or the second air duct 320, but may also close the air path to block air flow.

As a result, when the inlet adjusting device 311 and the outlet adjusting device 321 are closed, a configuration of the supply adjusting device 331, the air path changing device 351, and the ventilation device 200 of each respective indoor room S1-S4 may be controlled to create an air flow between any of the indoor rooms S1-S4. The air flow may transfer air inside a specific indoor room, for example, indoor room S1, to another indoor room, for example, indoor room S3, such that air inside one indoor room may be diffused or heat-exchanged with air in another indoor room.

Further, the ventilation device 200 may include a total heat exchanger 210, an inlet fan 220, an outlet fan 230, an inlet valve 240 that adjusts a flow of air drawn into the respective indoor room, and an outlet valve 250 that adjusts a flow of air exhausted out of the respective indoor room. When the inlet fan 220 is in operation, air may be drawn through the supply duct 330 into the ventilation device 200. Further, the drawn air may be passed through or bypassed around the total heat exchanger 210. The drawn air may then be supplied into the indoor room S1-S4 via the inlet fan 220.

When the outlet fan 230 is in operation, air inside the indoor room S1-S4 may be drawn into the ventilation device 200 and may be passed through or bypassed around the total heat exchanger 210. The air may then flow outside through second air duct 320 or flow towards another indoor room S1-S4 via the outlet fan 230.

Figure 3:
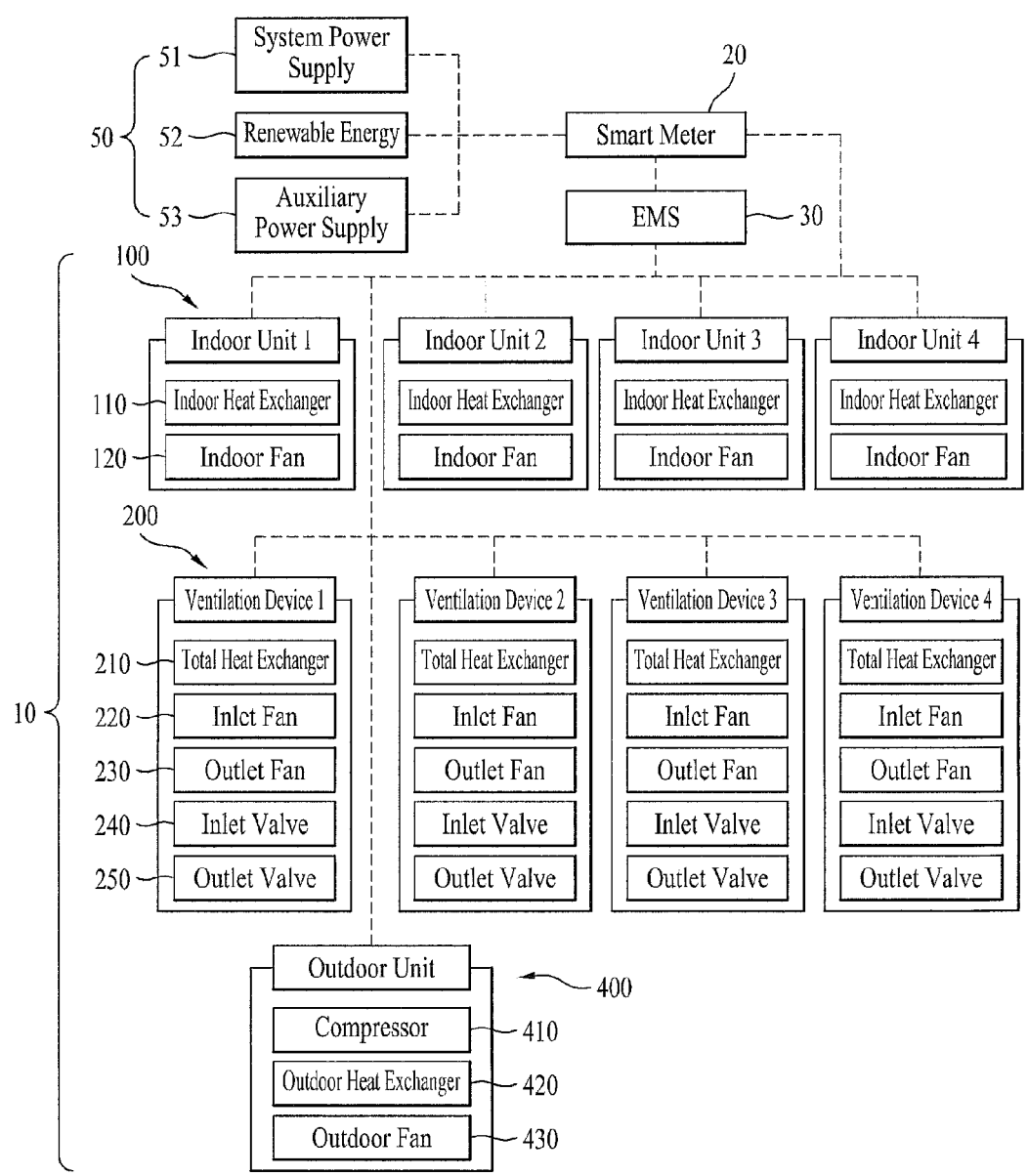
FIG. 3 is a block diagram of the air conditioner of FIG. 2.

FIG. 3 is a block diagram of the air conditioner 10 of FIG. 2. Referring to FIG. 3, the air conditioner 10, the electric power supply 50, the smart meter 20, and the EMS 30 may be interconnected. As described above, the electric power supply 50 may include the system power supply 51, the renewable energy 52, and/or the auxiliary power supply 53. A supply of electric power to the air conditioner 10 may be controlled by the EMS 30.

The air conditioner 10 may include the indoor unit 100 and the ventilation device 200, which may be installed in each of the indoor rooms S1-S4, and an outdoor unit 400. The indoor unit 100 may include an indoor fan 102 and heat exchanger 101. The indoor fan 102 may guide air that is heat-exchanged by an indoor heat exchanger 101 into the respective indoor room S1-S4. A rotational speed of the indoor fan 102 may be controlled to adjust the amount of air supplied to the respective indoor rooms S1-S4.

Further, as described above, the ventilation device 200 may include the total heat exchanger 210, the inlet fan 220, the outlet fan 230, the inlet valve 240, and the outlet valve 250. The outdoor unit 400 may include a compressor 410 that compresses refrigerant, an outdoor heat exchanger 420, and an outdoor fan 430 that guides air toward the outdoor heat exchanger 420.

A rotational speed of the indoor fan 120 may be adjusted to control an amount of air flow into the respective indoor room S1-S4 according to adjustments in the power supplied. The ventilation device 200 may be controlled to adjust an amount of the air drawn into or exhausted out of each indoor room S1-S4 based on an on/off state or a rotation number adjustment of the inlet fan 220 and the outlet fan 230. Further, the outdoor unit 400 may be controlled to adjust an amount of refrigerant supplied from the compressor 410 according to an amount of the electric power supplied. The outdoor unit 400 may also be controlled to vary a rotational speed of the outdoor fan 430 to adjust a degree of condensation created by the refrigerant in the outdoor heat exchanger 410.

Figure 4:
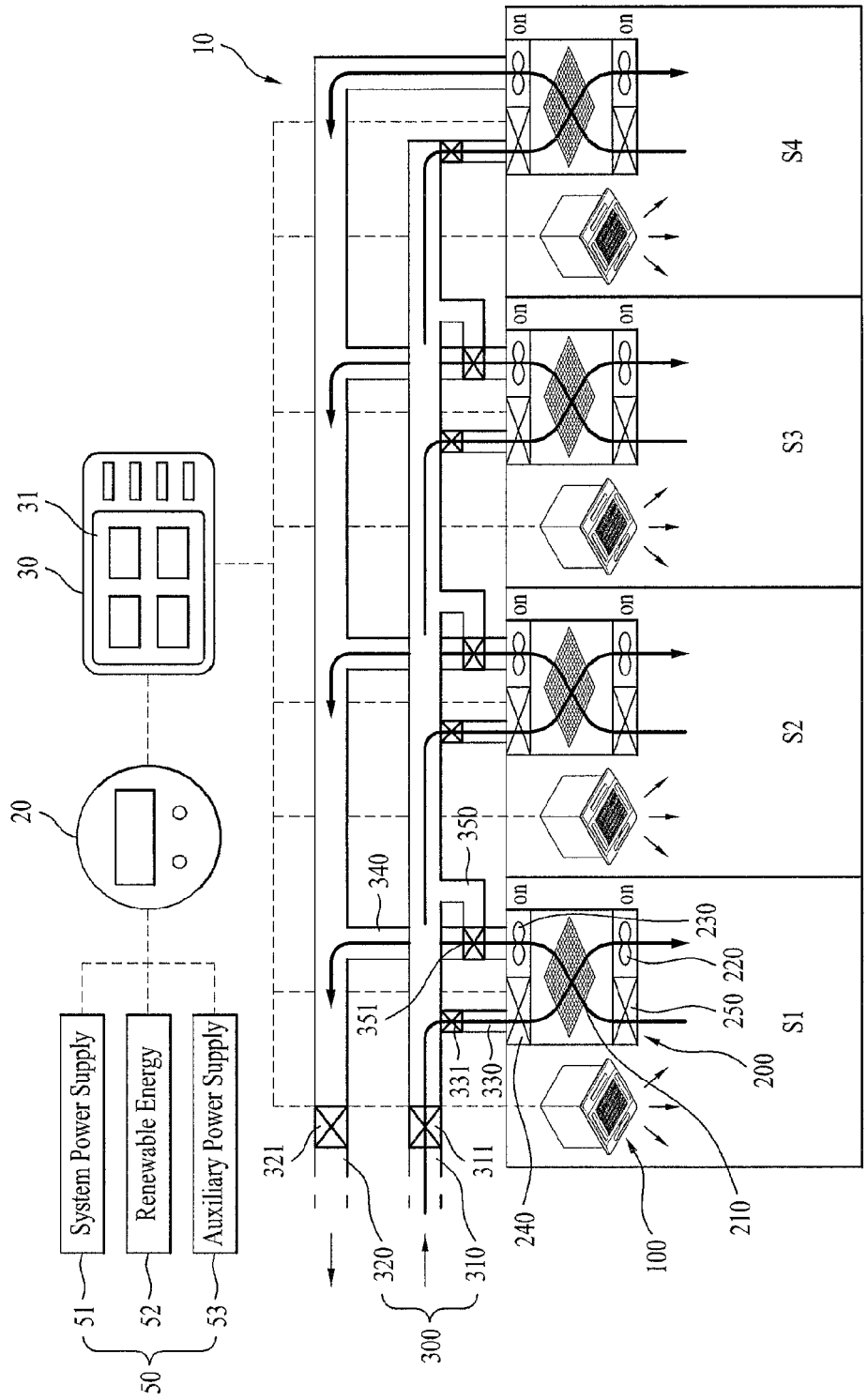
FIGS. 4 to 6 illustrate an air flow inside the air conditioner of FIG. 2.

FIG. 4 illustrates an air flow inside each of the indoor rooms S1-S4 according to the operation of the air conditioner 10. When the power rate is low, for example, when cost of electricity is low during off peak hours, the indoor unit 100 of the air conditioner 10 may be controlled to operate in a heating or cooling mode based on the user set temperatures. The ventilation device 200 may also be controlled to ventilate the indoor air even when ventilation may reduce the efficiency of the air conditioner 10 by allowing a heat exchange between the drawn ambient air and the treated internal air.

For example, in the heating mode, indoor unit 100 may provide hot air to heat the room, and in the cooling mode, indoor unit 100 may provide cold air to cool the room. Accordingly, temperatures inside each of the indoor rooms S1-S4 may be controlled by the indoor unit 100.

Further, the inlet fan 220 of ventilation device 200 may operate to draw in external air via the first air duct 310 into one or more of the indoor rooms S1-S4. The outlet fan 230 of ventilation device 200 may also operate to exhaust internal air from one or more of the indoor rooms S1-S4 through the exhaustion duct 340 and the second air duct 320. During ventilation, the air path changing device 351 may be controlled to direct air flow towards the second air duct 320, bypassing the connection duct 350. Accordingly, the air exhausted from the indoor rooms S1-S4 may be prevented from being drawn into the first air duct 310.

Figure 5:
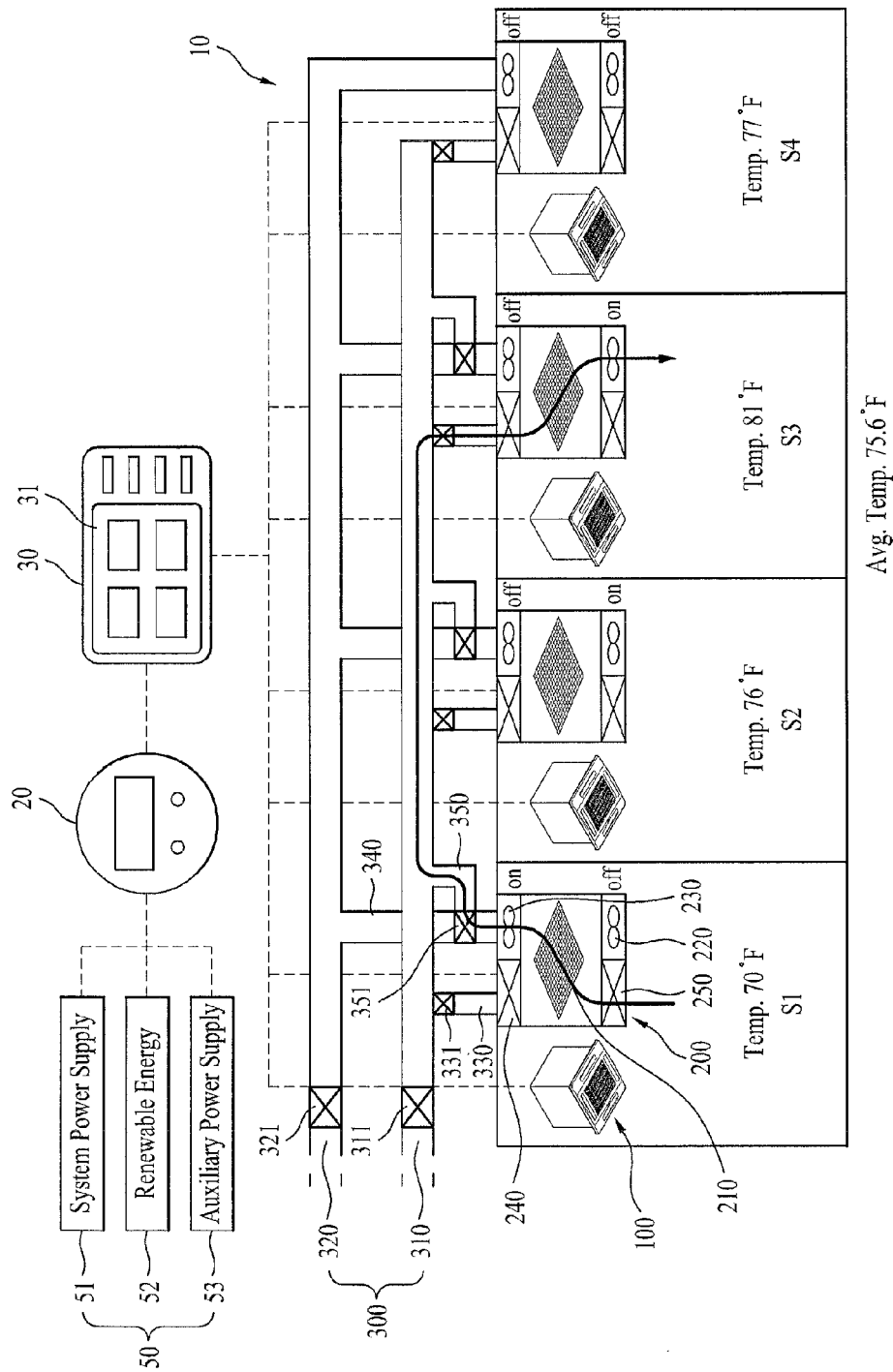
Figure 6:
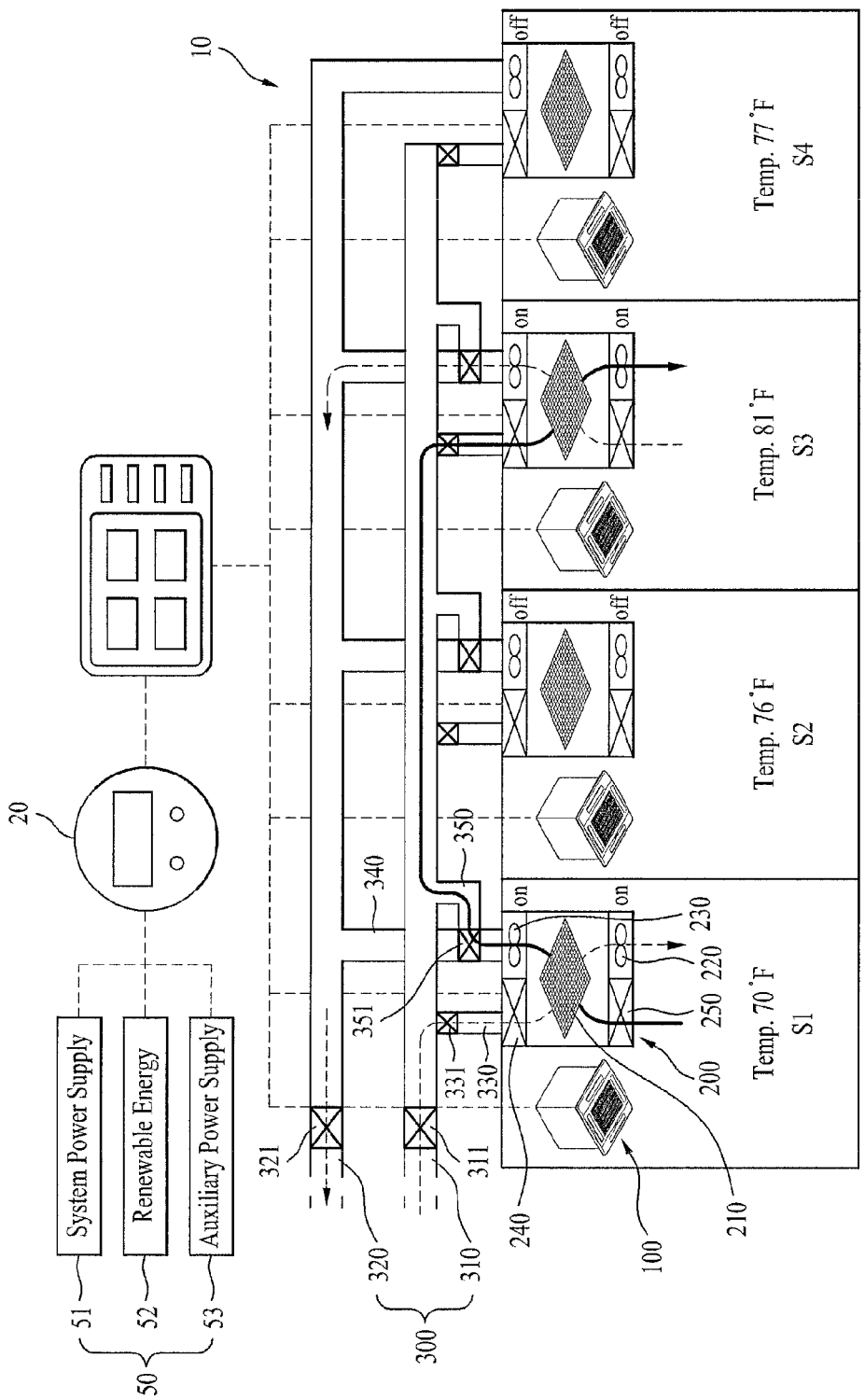

FIG. 5 illustrates an air flow between two of the indoor rooms S1-S4 according to an operation of the air conditioner 10. For example, temperature of an indoor room S3 may be controlled by a transfer of treated air from another indoor room S1. FIG. 6 illustrates a ventilation of an indoor room during the operation of the air conditioner 10 as illustrated in FIG. 5. For example, during ventilation, external air may be drawn into and/or internal air may be exhausted out of the indoor rooms S1-S4 to improve air quality, or to improve a comfort sensation inside the indoor rooms S1-S4. Ventilation of the indoor room may improve air quality or the comfort sensation, for example, by adjusting the humidity or $CO_2$ levels in the indoor rooms S1-S4. Moreover, ventilation may be performed based on, for example, relative temperature, humidity level, $CO_2$ or other contaminant levels in the respective indoor rooms, or current power rates. FIGS. 7 to 12 are flow charts that illustrate an operation of the air conditioner 10 as shown in FIGS. 5 and 6.

Figure 7:
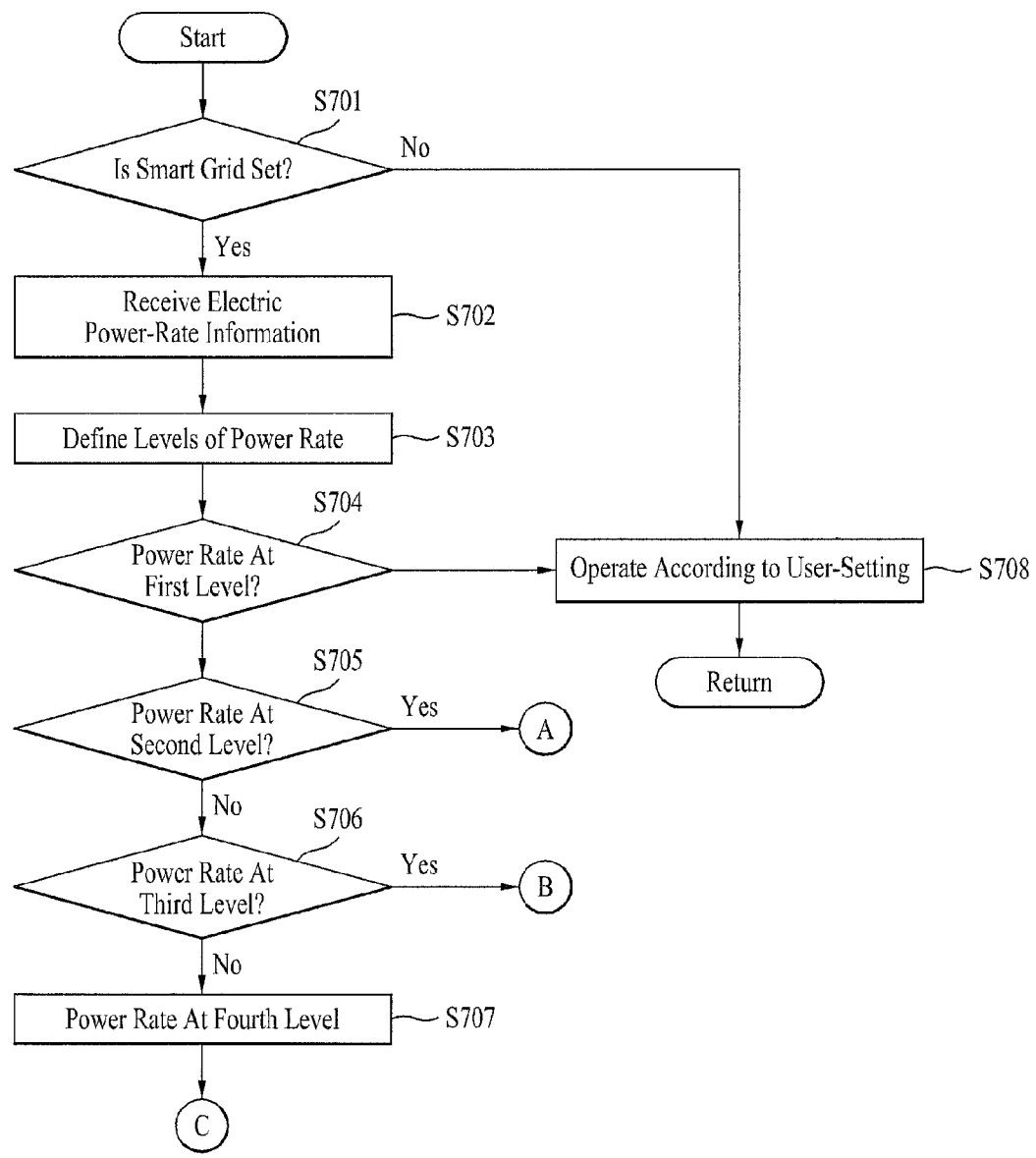
FIGS. 7 to 12 are flow charts of an operation of the air conditioner.

Referring to FIG. 7, it may be determined whether a smart grid function is set, in step S701. The smart grid function may adjust power consumption of a building in response to changes in the power rate. If the smart grid function is not set, the air conditioner may operate according to a user setting, in step S708.

If the smart grid function is set, power information from an external source may be received and recognized by the air conditioner, in step S702. This process may be implemented by the smart meter 20 or the EMS 30. Moreover, user preferences for each of the plurality of indoor rooms S1-S4 may be retrieved from the EMS 30. The user preferences may include a smart grid function setting, target temperature, or other appropriate settings for each respective indoor room. For example, the smart grid function may be set for each of the plurality of indoor rooms S1-S4 separately or centrally. If a temperature setting of a specific indoor room is critical, for example, a room containing servers or other temperature sensitive equipment, the user may want to operate the indoor unit in that room regardless of the current power rate. In that case, the smart grid function for the temperature sensitive room may be turned off, and the respective indoor unit may be controlled based on the user set temperature.

Figure 13:
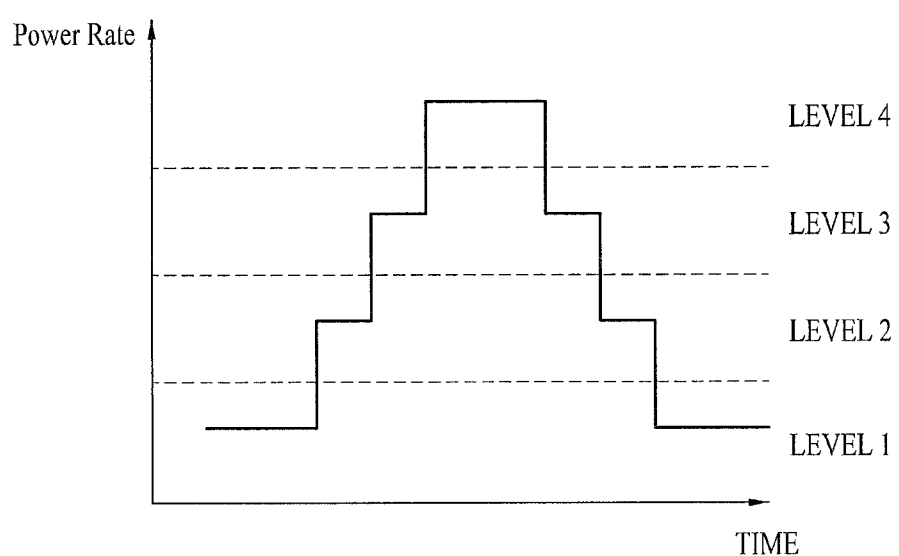
FIG. 13 is a graph that shows changes in levels of a power rate with respect to time.

In step S703, levels of the power rates may be defined and a level of the current power rate may be identified. Referring to FIG. 13, the power rate may change with respect to time. The levels of the power rate may be defined based on the changes in the power rate. The operation of the air conditioner may then be controlled according to the defined levels.

The levels of the power rate may be categorized into a first level (Level 1), a second level (Level 2), a third level (Level 3), and a fourth level (Level 4). Simply for ease of explanation, the levels of the power rate are described herein as increasing in relation to increased costs. For example, the first level may be a period associated with the lowest power rate or cost, and the fourth level may be a period associated with the highest power rate or cost. However, the embodiments disclosed herein are not limited thereto.

Once the levels of the power rate are defined, in step S703, the current level of the power rate may be determined. If the current power rate is determined to be within the first level, in step S704, the air conditioner may be operated as set by the user, in step S708. For example, the air conditioner may operate in a heating or cooling mode and/or a ventilation mode in consideration of a target temperature for the indoor room as set by the user.

Figure 8:
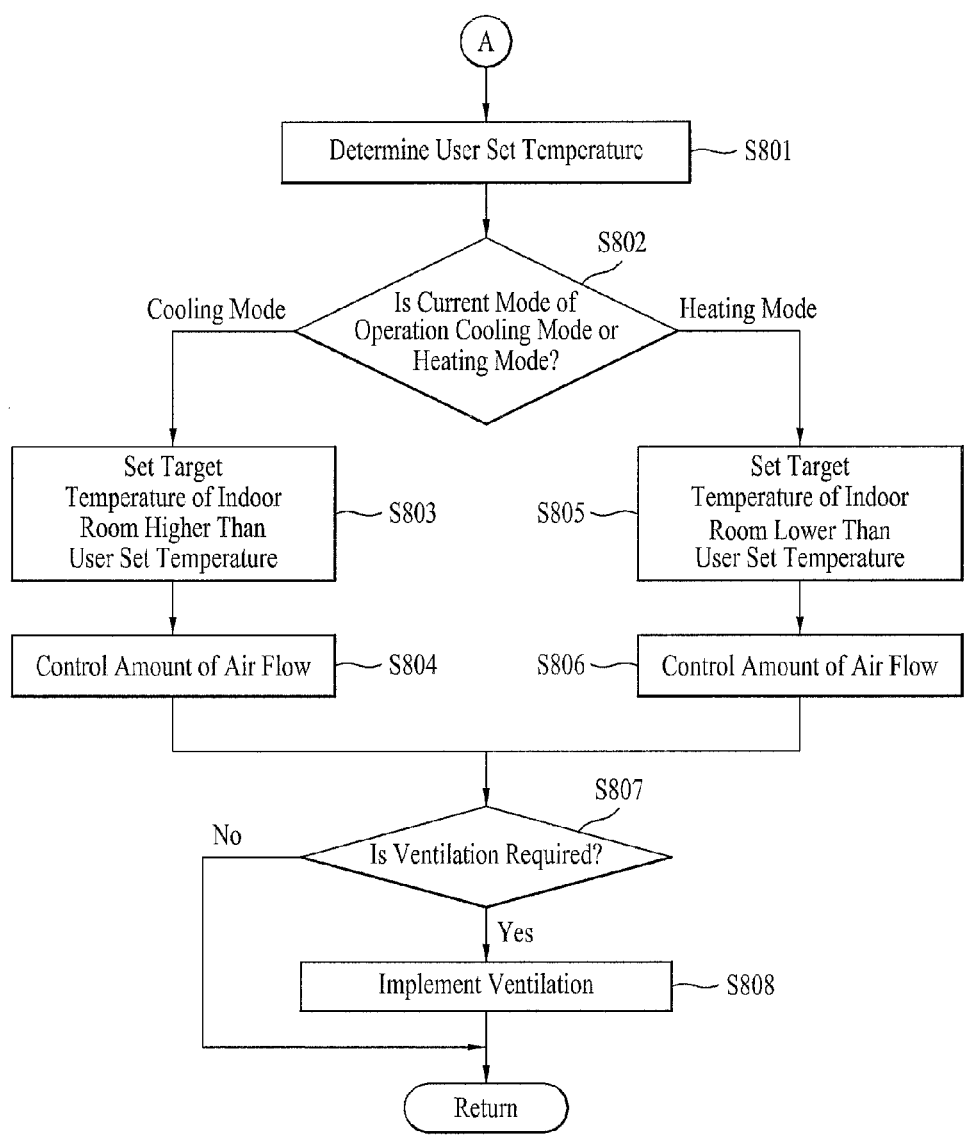
Figure 9:
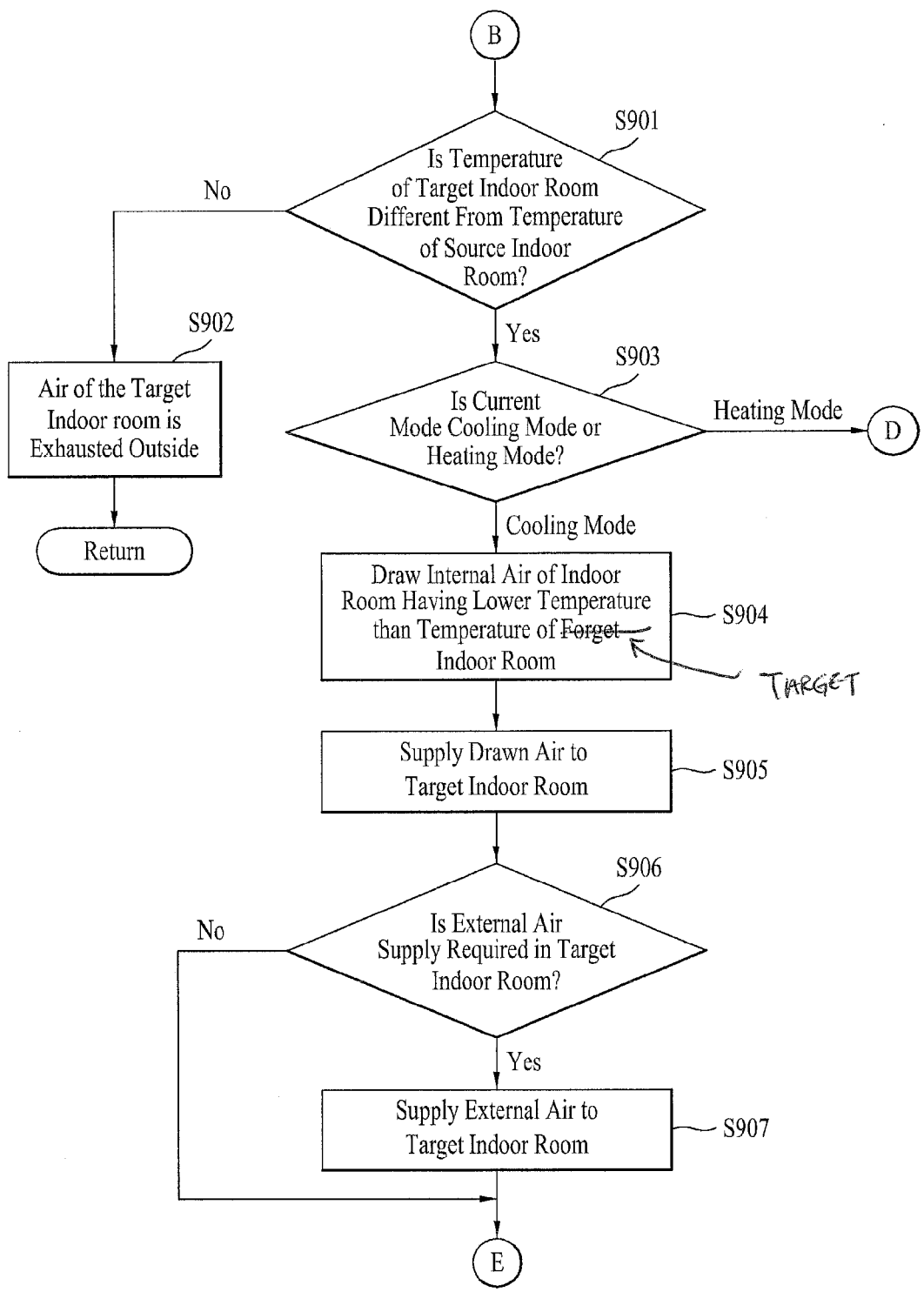
Figure 12:
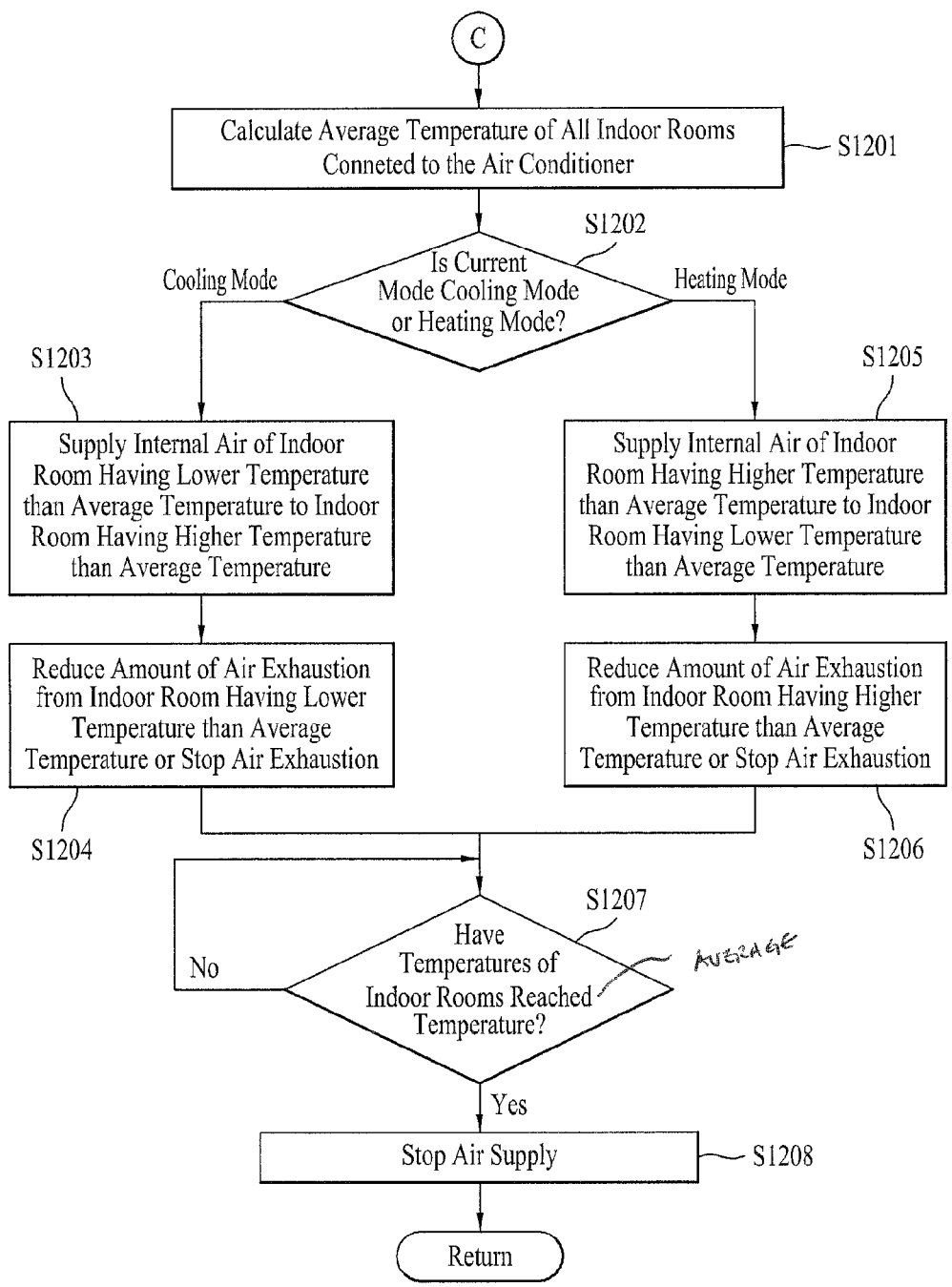

In steps S705 to S707, the air conditioner may determine whether the level of the current power rate is within one of the second to fourth levels. FIG. 8 is a flow chart of an operation of the air conditioner when the current level of power rate is within the second level. FIG. 9 is a flow chart of an operation of the air conditioner when the current level of power rate is within the third level. FIG. 12 is a flow chart of an operation of the air conditioner when the current level of power rate is within the fourth level.

Referring now to FIG. 8, when the current power rate is within the second level, a user set temperature set by the user may be determined, in step S801. It may be determined whether a current mode of operation of the indoor and outdoor units is a cooling mode or heating mode, in step S802. When the current mode is determined to be the cooling mode, a target temperature of the indoor room may be set higher than the user set temperature, in step S803. The indoor fan of the indoor unit may be controlled to adjust the amount of air flow, in step S804. Here, the target temperature may be increased by a predetermined amount and the speed of the indoor fan may be set higher to compensate for the increase in the target temperature.

For example, if the user set temperature is 74° F., the target temperature of an indoor room may be adjusted to be 76° F. or 75° F. The amount of adjustment may be set by the user to be within a predetermined amount of the user's desired temperature or a default adjustment range may be used. This adjustment in target temperature may result in a reduction of compressor operation. As a result, power consumption may be reduced, thereby reducing costs associated with the increased power rate.

When the current mode of operation is determined to be the heating mode, in step S802, the target temperature of the indoor room may be set lower than the user set temperature, in step S805. The rotational speed of the indoor fan installed in the indoor unit may be controlled to adjust the amount of air flow, in step S806. Here, in contrast to the cooling mode, the target temperature may be set lower than the user set temperature by a predetermined amount and the amount of air flow may be increased to compensate for the decrease in the target temperature.

For example, if the user set temperature is 79° F., the target temperature of the indoor room may be adjusted to be 77° F. or 78° F. The difference in temperatures may not be noticed or felt by the occupants of the room, however, costs associated with the increase in the power rate may be reduced. Further, the amount of adjustment may be set to an amount that may go unnoticed by the occupants or to an amount that the user is willing to tolerate.

If the adjustment in the target temperature deteriorates the air quality or effects an occupant's comfort level, the user may determine that ventilation is required, in step S807. In the ventilation mode, the inlet fan 220 and the outlet fan 230 of the ventilation device 200 may be turned on to exhaust internal air to the outside and/or to draw in external air to the inside, in step S808, as shown in FIG. 4.

If the current power rate is determined to be within the third level, in step S706 of FIG. 7, as the power rate in this level may be quite high, an operation of the indoor and outdoor units may be suspended for a predetermined time period. Accordingly, the temperatures of the indoor rooms may be adjusted by distributing internal air among the indoor rooms to achieve heat transfer or heat exchange.

By distributing treated air between the indoor rooms, a temperature of a specific indoor room may be adjusted while costs associated with the increased power rate may be reduced. Referring to FIG. 9, a difference in temperatures between a specific indoor room (target indoor room), and another indoor room (a source indoor room) may be determined, in step S901.

If the temperature difference between the indoor rooms is small, for example, the temperature difference is less than a predetermined amount, the distribution of air between the indoor rooms may not be necessary. Therefore, the air of the target indoor room may be exhausted to the outside of the building to improve the air quality or comfort sensation, in step S902. For example, removing stale indoor air may improve the air quality or comfort sensation in the room by adjusting the humidity or $CO_2$ levels in the indoor room.

However, if the temperature difference between the specific indoor room and another indoor room is greater than or equal to the predetermined amount, the air may be distributed between the indoor rooms. In step S903, it may be determined whether the current operational modes of the target indoor room and the source indoor room is either a heating mode or cooling mode, in step S903.

Simply for ease of explanation, with reference to FIG. 5, the target indoor room is described herein as being indoor room S3 and the source indoor room is described herein as being indoor room S1. If the air conditioner is determined to be in the cooling mode, in step S903, internal air of the source indoor room S1 that has a lower temperature than the target indoor room S3 may be drawn, in step S904, and supplied to the target indoor room S3, in step S905.

In another embodiment, the internal air of an indoor room determined to have a lowest temperature among the plurality of indoor rooms (source indoor room) may be supplied to another indoor room determined to have the highest temperature (target indoor room). In a further embodiment, the internal air of an indoor room determined to have a temperature less than or equal to a target temperature of another indoor room may be supplied thereto.

For example, a selection of a target indoor room or a source indoor room may include consideration of a temperature and/or size of the respective indoor rooms relative to a temperature and/or size of the other indoor room. For example, a source indoor room at a temperature close to the target temperature of the target indoor room may be unable to sufficiently adjust the temperature of the target indoor room. Likewise, a source indoor room that is relatively small in size may be unable to sufficiently adjust a temperature of a target indoor room that is relatively large in size. Therefore, in selecting the source indoor room, the EMS 30 may be configured to select an indoor room that is capable of adjusting the temperature of the target indoor room based on the relative temperatures and/or size.

Additionally, if one source indoor room is unable to sufficiently adjust the temperature of the target indoor room, multiple source indoor rooms may be selected to transfer air to the target indoor room. The multiple source indoor rooms may be configured to transfer indoor air to the target indoor room at the same time, or each of the multiple source indoor rooms may sequentially transfer indoor air until the target indoor room has reached its target temperature.

Moreover, as previously described, the EMS 30 may store user preferences associated with the indoor unit of each of the indoor rooms, including a smart grid function setting, user set temperature, humidity level, $CO_2$ level, or the like. The preference setting may also include a priority level for each indoor room that may be considered when selecting the source and target indoor rooms. For example, an indoor room having a high priority level may be selected to be the target indoor room prior to other indoor rooms having a lower priority level.

During the distribution of internal air between the indoor rooms, the indoor unit installed in the target indoor room S3 and the indoor unit installed in the source indoor room S1 may be turned off or operated intermittently to reduce power consumption. The outdoor unit connected to the indoor units of the indoor rooms S1, S3 may also be turned off or operated intermittently.

FIG. 5 illustrates the configuration of the air ducts between the target indoor room S3 and the source indoor room S1 during steps S904 and S905. The inlet adjusting device 311 of the first air duct 310 and the outlet adjusting device 321 of the second air duct 320 may be closed to isolate the indoor rooms from the outside. In the target indoor room S3, the inlet valve 240 of the ventilation device 200 and the supply adjusting device 331 of the supply duct 330 may be controlled to be open. Further, the inlet fan 220 of target indoor room S3 may be turned on.

In the source indoor room S1, the outlet valve 250 of the ventilation device 200 may be controlled to be open. The air path changing device 351 that connects the connection duct 350 and the exhaustion duct 340 may be configured to route air flow exhausted from the ventilation device 200 toward the first air duct 310.

The outlet fan 230 of the source indoor room S1 may then be turned on to draw air from the source indoor room into the first air duct 310. The drawn air may then be guided through the first air duct 310 and drawn into ventilation device 200 of the target indoor room S3. For example, if the temperature of the target indoor room S3 is 81° F. and the temperature of the source indoor room S1 is 70° F., as shown in FIG. 5, the temperature of the target indoor room S3 may be lowered through the distribution of air from the source indoor room S1.

Ventilation may be required because of poor air quality or comfort sensation, for example, due to increased humidity levels, $CO_2$ levels, or other contaminants in the indoor air. The EMS 30 of the air conditioner 10 may determine whether air should be exhausted from an interior room, external air (or fresh air) supplied to the room, or both. As previously described, FIG. 6 illustrates the air conditioner 10 configured to introduce external air into the indoor room S1.

In step S906, it may be determined whether external air supply is required in the source indoor room S1. If external air is determined to be required in the source indoor room S1, in step S906, the inlet adjusting device 311 of the first air duct 310 may be opened a predetermined degree. Further, the inlet valve 240 of the ventilation device 200 may be opened and the inlet fan 220 may be turned on to draw in external air. Thus, ambient air may be introduced into the indoor room S1, in step S907, as shown by a dotted line in FIG. 6, to improve the air quality and/or comfort sensation of the indoor room S1.

When the inlet adjusting device 311 of the first air duct 310 is open to draw in external air, the external air may mix or diffuse with the interior air drawn from the source indoor room S1 for distribution to the target indoor room S3. To prevent possible heat transfer between the two air flows, for example, in the first air duct 310, the inlet adjusting device 311 may be controlled to open intermittently to minimize mixture of the air flows.

Further, the incoming external air may mix with the interior air drawn from the source indoor room S1 inside the ventilation device 200. If the two air flows are allowed to mix, heat exchange may occur affecting the temperature of the outgoing interior air that is drawn for distribution to the target indoor room S3. To prevent this heat exchange, the two air flows may be configured to flow around the total heat exchanger 210, bypassing the total heat exchanger 210 without being drawn therein, such that the two air flows may be moved along independent paths that are physically separated.

Figure 10:
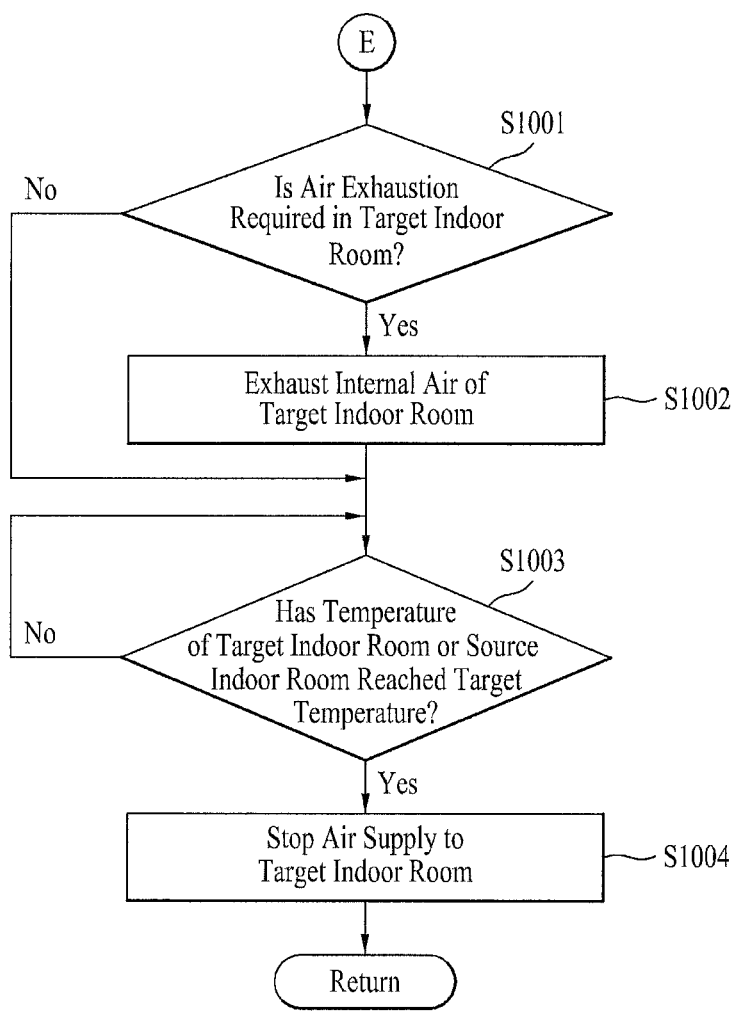

Referring to FIG. 10, it may be determined whether air exhaustion is required in the target indoor room S3 to exhaust internal air to the outside, in step S1001. For example, when untreated air having a high temperature remains in the target indoor room S3, exhaustion of the hot interior air may accelerate the cooling process of the target indoor room S3. Moreover, air exhaustion of the target indoor room S3 may be performed to improve the air quality or the comfort sensation of the internal air. For example, when $CO_2$ levels in the target indoor room S3 is high, exhausting the contaminated air may improve the air quality.

If it is determined that the internal air of target indoor room S3 should be exhausted, in step S1001, the air conditioner may be operated to discharge the internal air to the outside, in step S1002. FIG. 6 illustrates the configuration of the air ducts and the ventilation device 200 during the air exhaustion. The outlet adjusting device 321 of the second air duct 320 may be controlled to be open. In the target indoor room S3, the outlet valve 250 of the ventilation device 200 may be opened and the outlet fan 230 may be turned on. The air path changing device 351 may then be operated to guide the air toward the exhaustion duct 340 and block the air flow into the connection duct 350. Accordingly, the air exhausted from the specific indoor room S3 may flow through the second air duct 320 to be exhausted to the outside.

In step S1003, it may be determined whether the temperature of the target indoor room S3 or the source indoor room S1 has reached a target temperature. The target temperature may be determined by the EMS 30 based on respective room temperatures or user desired temperatures. If the target temperature has been reached, the air supply to the target indoor room S3 may be stopped, in step S1004. For example, the source indoor room S1 may reach the target temperature prior to the target indoor room S3 if the source indoor room S1 is smaller than the target indoor room S3, or if the original temperature of the source indoor room S1 was closer to the target temperature than the original temperature of the target indoor room S3. In this case, another indoor room may be selected to provide cold air to the target indoor room. Moreover, to stop the air supply from the source indoor room S1 to the target indoor room S3, in step S1004, the EMS 30 may control the components of the respective indoor rooms to stop the distribution of air.

Figure 11:
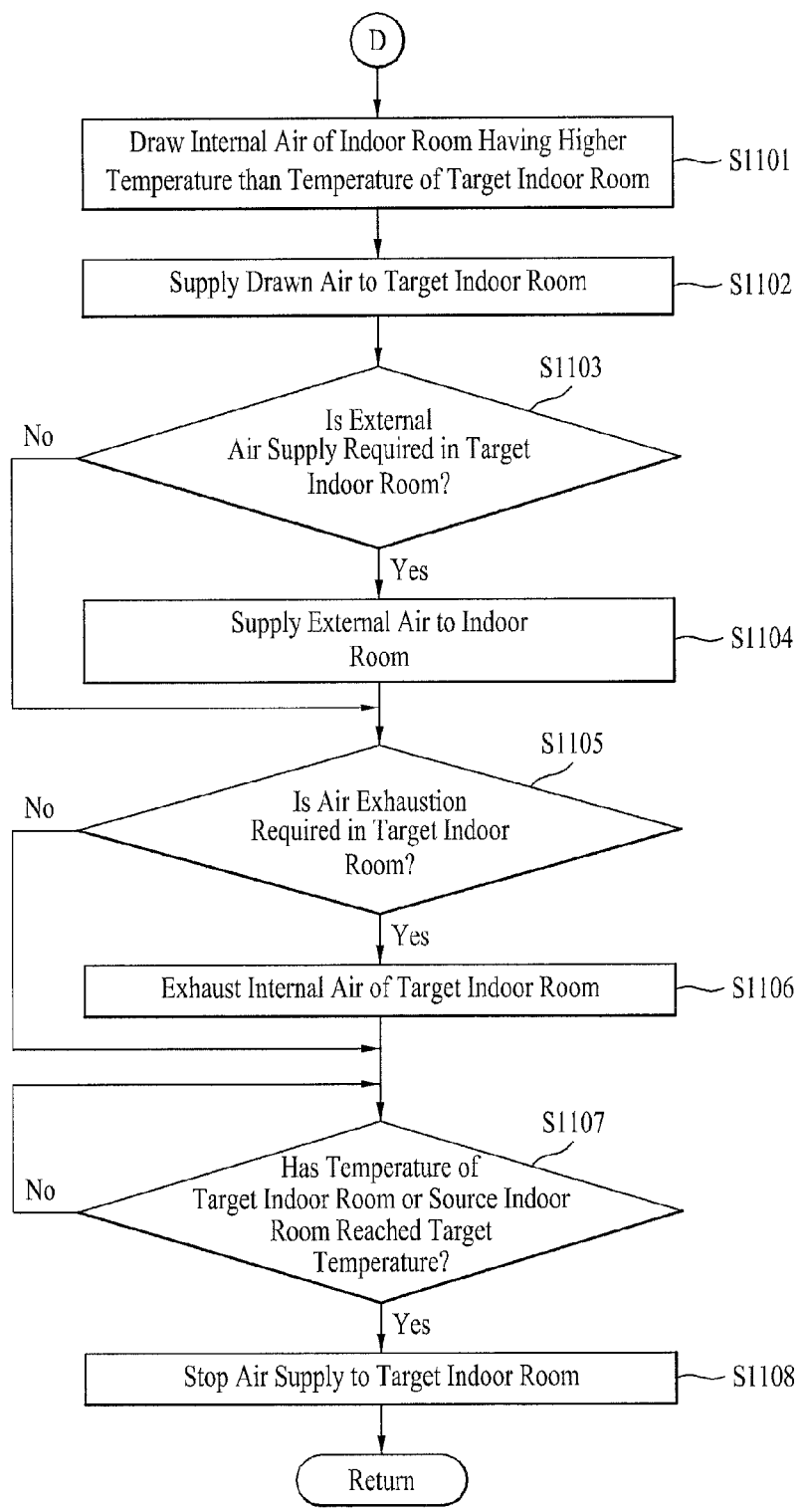

Referring to FIG. 11, if the current mode of operation is determined to be the heating mode, in step S903 of FIG. 9, an internal air of an indoor room that has a temperature higher than a temperature of another indoor room may be distributed to the other indoor room. For example, if the internal air of the source indoor room S1 is determined to be higher than the internal air of the target indoor room S3, the treated air from the source indoor room S1 may be drawn, in step S1101, and supplied to the target indoor room, in step S1102, as shown in FIG. 11. Steps S1103 to 1108 are substantially the same as steps S906 to S907 and S1001 to S1004 as previously described with reference to FIGS. 9 and 10. Accordingly, repetitive descriptions thereof are omitted herein.

Referring to FIG. 12, if the current power rate is determined to be within the fourth level, in step S707 of FIG. 7, an average temperature may be calculated for all the indoor rooms S1-S4 that are connected to the air conditioner 10, in step S1201.

For example, if the temperatures of the indoor rooms S1-S4 are determined to be 70° F., 76° F., 81° F., and 77° F., respectively, an average temperature may be calculated based on those values. In this case, the average temperature may be calculated to be 76° F. Moreover, if the sizes of the indoor room are different, the respective volume of air in each of the indoor rooms may be considered when calculating the average temperature. For example, one or more relatively smaller room may be required to adjust a temperature of a relatively larger room.

It may then be determined whether the current operational mode of each indoor room is either a cooling or heating mode, in step S1202. If the current mode is the cooling mode, an internal air of an indoor room having a temperature lower than the average temperature may be supplied to an indoor room having a temperature higher than the average temperature, in step S1203. During the distribution of air between the indoor rooms, the indoor units installed in each indoor room and the outdoor unit connected to the indoor room may be turned off or operated intermittently to reduce power consumption.

For example, when the power rate is at the highest value or at peak levels, an operation of various components of the air conditioner 10 may be suspended or operated intermittently to minimize power consumption. Accordingly, an operation of the compressor 410 and/or the outdoor fan 430 of the outdoor unit 400 and/or the indoor fan 120 of the indoor unit 100 may be suspended. However, an operation of the ventilation device 200, having a relatively low power consumption, may be continued to adjust temperatures in each of the indoor room by distributing internal air therebetween.

Further, if the internal air of the source indoor room is being exhausted to the outside during the air distribution, the amount of air exhausted may be reduced or the air exhaustion may be stopped, in step S1204. For example, the air exhaustion may be implemented to improve an air quality or a comfort sensation of the indoor room. However, in a cooling mode, air exhaustion may raise the temperature of the treated air inside the source indoor room. As temperature control of the indoor room may have priority over air quality of comfort sensation during peak power rate levels, air exhaustion may be reduced or stopped. Therefore, the air exhaustion of the corresponding source indoor room may be reduced or suspended to preserve the treated internal air of the source indoor room for use in reducing the temperature of the target indoor room.

In the air conditioner 10 as shown in FIG. 5, the current average temperature may be calculated to be 76° F., in step S1201. Indoor rooms having temperatures lower than the average temperature and higher than the average temperature may then be determined. As previously described, the source and target indoor rooms may be determined by the EMS 30 based on, for example, the size of the rooms, the respective temperatures of each room, and/or the user preferences including priority of the indoor rooms and smart grid function settings. Thus, in the cooling mode, the internal air of the indoor room S1 that has a temperature noticeably lower than the average temperature, in this example, 76° F., may be supplied to indoor rooms S3 and S4 that have higher temperatures, 81° F. and 77° F., respectively.

If the current mode is determined to be the heating mode, in step of S1202, an internal air of an indoor room having a higher temperature than the average temperature may be supplied to an indoor room having a lower temperature than the average temperature, in step S1205. Further, the indoor unit installed at each of the indoor rooms and the outdoor unit in communication with the indoor units may be turned off or operated intermittently to reduce power consumption as previously described.

If internal air is being exhausted from the source indoor room during the air transfer from the source indoor room having a higher temperature to a target indoor room having a lower temperature, the amount of air exhausted may be reduced or the air exhaustion may be stopped, in step S1206. For example, the air exhaustion may be implemented to improve an air quality or a comfort sensation of the indoor room. However, during peak levels, the temperature adjustment of the indoor room that has a relatively low temperature may have priority over air quality or comfort sensation. Therefore, the air exhaustion of the corresponding indoor room may be reduced or suspended to preserve the treated internal air of the source indoor room for use in increasing the temperature of the target indoor room.

In step S1207, it may be determined whether the temperatures of each of the indoor rooms have reached the average temperature. If a source indoor room reaches the average temperature prior to a target indoor room, additional internal air from other indoor rooms may be used until all indoor rooms have reached the average temperature. Once the interior air in each of the indoor rooms has been adjusted, the air supply to each of the respective indoor rooms may be stopped, in steps S1207 and S1208.

An air conditioner and a method of controlling the same are disclosed herein. A control method of an air conditioner installed in a plurality of indoor rooms may implement temperature adjustment of the indoor rooms and reduce costs associated power rates by controlling power consumption flexibly according to a level of the power rate.

Further, a control method of an air conditioner may include an electric power rate information recognizing step; and an air supplying step configured to supply internal air of an indoor room to another indoor room to reduce a temperature difference of a plurality of indoor rooms.

When the air conditioner implements a cooling operation, the air supplying step may supply internal air of another indoor room having a temperature lower than a temperature of a specific indoor room. The air supplying step may supply internal air of an indoor room having the lowest temperature to an indoor room having the highest temperature among the plurality of the indoor rooms.

When the air conditioner implements a heating operation, the air supplying step may supply internal air of another indoor room having a higher temperature than a temperature of internal air of a specific indoor room to the specific indoor room. The air supplying step may supply internal air of an indoor room having the highest temperature to an indoor room having the lowest temperature among the plurality of the indoor rooms.

The air supplying step may supply internal air of another indoor room having a predetermined temperature different from a target temperature of a specific indoor room to a specific indoor room, in consideration of the target temperature of the specific indoor room among the plurality of the indoor rooms.

When the air conditioner implements a cooling operation, the air supplying step may supply internal air of another indoor room having a temperature lower than a target temperature of a specific indoor room to the specific indoor room. When the air conditioner implements a heating operation, the air supplying step may supply internal air of another indoor room having a higher temperature than a target temperature of a specific indoor room to the specific indoor room.

The control method may further include an external air supplying step configured to supply external air of a building to the indoor room provided in the building when a comfort sensation degree of the indoor room, of which internal air may be supplied to another indoor room, is out of a predetermined range. The control method may further include an air exhausting step, configured to exhaust internal air of a specific indoor room outside a building that includes the indoor room, to control a temperature of the specific indoor room receiving internal air of another indoor room. Air exchange between indoor rooms may be stopped when an air exchange stop command is inputted by a user.

The control method may further include an average temperature calculating step configured to sense temperatures of a plurality of indoor rooms and to calculate an average temperature of the indoor rooms, wherein the air supplying step may supply internal air of an indoor room having a lower temperature than the average temperature to an indoor room having a higher temperature than the average temperature when a current operation is a cooling operation; and the air supplying step may supply internal air of an indoor room having a higher temperature than the average temperature to an indoor room having a lower temperature than the average temperature when the current operation is a heating operation. Further, the control method may include an air exhausting step configured to reduce the amount of air exhaustion to an outside of a building from an indoor room having the higher temperature than the average temperature when in the heating mode.

The control method may further include a leveling step configured to determine a level of a current power rate, and wherein the level of the current power rate determined by the leveling step may be put into consideration and when the current power rate is in a first level, the air conditioner is controlled to operate according to a user's setting; when the current power rate is in a second level, a user setting temperature may be recognized and a target control temperature of an indoor room is controlled to be set higher than the user setting temperature; and when the current power rate is in a third level, the air supplying step may be implemented.

When the current power rate is in a fourth level that may be higher than the third level, temperatures of the plurality of the indoor rooms may be sensed and an average temperature of the sensed temperatures may be calculated; when the current operation is a cooling operation, the air supplying step may supply internal air of an indoor room having a lower temperature than the average temperature to an indoor room having a higher temperature than the average temperature; and when the current operation is a heating operation, the air supplying step may supply internal air of an indoor room having a higher temperature than the average temperature to an indoor room having a lower temperature than the average temperature.

In another embodiment, a control method of an air conditioner may include recognizing an electric power rate information; and controlling a difference generated between a user-set temperature and a target control temperature of an indoor room.

When a current operation mode is a cooling mode, the controlling may control the target control temperature of the indoor room to be higher than the user-set temperature; and when the current operation mode is a heating mode, the controlling may control the target control temperature of the indoor room lower than the user-set temperature. The control method may further include improving an amount of air exhausted from an indoor unit by controlling a fan of the indoor unit.

According to an embodiment, leveling of a power rate may be implemented according to an electric power rate information. When the power rate is relatively low, temperature adjustment and ventilation may be implemented according to a user-setting. When the power rate is relatively high, air exchange may be implemented between indoor rooms. As a result, power consumption may be reduced and the temperatures of indoor rooms may be controlled simultaneously.

Further, when the power rate is high with a cooling or heating operation being required to be implemented, internal air of another indoor room having a different temperature from a temperature of an indoor room in which the cooling or heating has to be implemented may be supplied to the indoor room. As a result, temperature adjustment for the indoor rooms may be enabled without heat-exchange with a refrigerant.

In another embodiment, a method of controlling an air conditioning system as broadly described and embodied here may include determining an electric power rate information; and supplying an internal air of a first indoor room to a second indoor room to reduce a temperature difference between the first and second indoor rooms based on the determined electric power rate information.

The method may further include controlling a target temperature of the second indoor room based on a user set temperature and the determined electric power rate information. The method may further include, during a cooling mode, supplying internal air from the first indoor room to the second indoor room, wherein a temperature of the first indoor room is lower than a temperature of the second indoor room; and wherein, during the cooling mode, the temperature of the first indoor room is a lowest temperature among a plurality of indoor rooms, and the temperature of the second indoor room is a highest temperature among the plurality of the indoor rooms.

The method may further include, during a heating mode, supplying internal air from the first indoor room to the second indoor room, wherein a temperature of the first indoor room is higher than a temperature of the second indoor room, and wherein, during the heating mode, the temperature of the first indoor room is a highest temperature among a plurality of indoor rooms, and the temperature of the second indoor room is a lowest temperature among the plurality of the indoor rooms.

The method may further include supplying internal air from the first indoor room to the second indoor room includes determining a temperature of the first indoor room, determining a target temperature of the second indoor room, and transferring the internal air from the first indoor room to the second indoor room based on the determined temperature of the first indoor room and the target temperature of the second indoor room, wherein, during a cooling mode, supplying the internal air from the first indoor room to the second indoor room when the temperature of the first indoor room is lower than the target temperature of the second indoor room, and wherein, during a heating mode, supplying internal air from the first indoor room to the second indoor room when the temperature of the first indoor room is higher than the target temperature of the second indoor room.

The method of may further include determining whether a degree of air quality in the first indoor room is outside a predetermined range; and supplying external ambient air to the first indoor room if the degree of air quality is outside the predetermined range, wherein determining the degree of air quality in the first indoor room includes determining whether an amount of humidity in the internal air is above a predetermined level, and wherein determining the degree of air quality in the first indoor room includes determining whether an amount of $CO_2$ in the internal air is above a predetermined level. The method may further include exhausting an internal air of the second indoor room to an outside of a building to control a temperature of the second indoor room that receives the internal air of the first indoor room, and stopping the supplying of air from the first indoor room to the second indoor room when a stop air exchange command is inputted by a user.

The method may further include sensing a temperature of the first indoor room and the second indoor room, and calculating an average temperature of the first and second indoor rooms, wherein during a cooling mode, supplying the internal air of the first indoor room to the second indoor room when a temperature of the first indoor room is lower than the average temperature and a temperature of the second indoor room is higher than the average temperature, and during a heating mode, supplying the internal air of the first indoor room to the second indoor room when the temperature of the first indoor room is higher than the average temperature and the temperature of the second indoor room is lower than the average temperature.

The method may further include exhausting an internal air from the first indoor room to an outside of a building, and during a cooling mode, reducing a rate of air exhausted from the first indoor room if the temperature of the second indoor room is higher than the average temperature, and during a heating mode, reducing the rate of air exhausted from the first indoor room if the temperature of the second indoor room is lower than the average temperature.

The method may further include determining a level of a current power rate, wherein if the current power rate is at a first level, controlling the air conditioner to operate according to a user set temperature, if the current power rate is at a second level, adjusting the user temperature in the second indoor room, and if the current power rate is at a third level, supplying the internal air from the first indoor room to the second indoor room; wherein in the cooling mode, adjusting the user set temperature includes setting a target temperature to be higher than the user set temperature; and, in the heating mode, adjusting the user set temperature includes setting a target temperature to be lower than the user set temperature.

The method may further include, if the current power rate is at a fourth level, sensing the temperature in a plurality of indoor rooms that includes the first and second indoor rooms and calculating an average temperature based on the sensed temperatures, wherein during a cooling mode, supplying the internal air from the first indoor room to the second indoor room, wherein the first indoor room has a lower temperature than the average temperature and the second indoor room has a higher temperature than the average temperature, and during a heating mode, supplying the internal air of the first indoor room to the second indoor room, wherein the first indoor room has a higher temperature than the average temperature and the second indoor room has a lower temperature than the average temperature.

Further, the air conditioner may include a compressor, an outdoor unit, a plurality of indoor units, and a ventilation system, and wherein when the current power rate is at the fourth level, reducing a power consumption rate of the air conditioner by shutting down the compressor, the outdoor unit, and the plurality of indoor units, while operating the ventilation system to supply the internal air from the first indoor room to the second indoor room. In the method, the determining the electric power rate information may include determining a peak cost of electric power.

In another embodiment, a method of controlling an air conditioner may include determining an electric power rate information; and controlling a target temperature of an indoor room based on a user set temperature and the determined electric power rate information. The method may further include, during a cooling mode, controlling the target temperature of the indoor room to be higher than the user set temperature; and during a heating mode, controlling the target temperature of the indoor room to be lower than the user set temperature; and controlling a fan of an indoor unit to improve the amount of air exhausted from the indoor unit.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an air conditioning system comprising:
   determining an electric power rate information;
   supplying an internal air of a first indoor room to a second indoor room to reduce a temperature difference between the first and second indoor rooms based on the determined electric power rate information; and
   determining a level of a current power rate, wherein
   if the current power rate is at a first level, controlling the air conditioner to operate according to a user set temperature,
   if the current power rate is at a second level, adjusting the user temperature in the second indoor room, and
   if the current power rate is at a third level, supplying the internal air from the first indoor room to the second indoor room.

2. The method of claim 1, further comprising controlling a target temperature of the second indoor room based on a user set temperature and the determined electric power rate information.

3. The method of claim 1, wherein, during a cooling mode, supplying internal air from the first indoor room to the second indoor room, wherein a temperature of the first indoor room is lower than a temperature of the second indoor room.

4. The method of claim 3, wherein, during the cooling mode, the temperature of the first indoor room is a lowest temperature among a plurality of indoor rooms, and the temperature of the second indoor room is a highest temperature among the plurality of the indoor rooms.

5. The method of claim 1, wherein, during a heating mode, supplying internal air from the first indoor room to the second indoor room, wherein a temperature of the first indoor room is higher than a temperature of the second indoor room.

6. The method of claim 5, wherein, during the healing mode, the temperature of the first indoor room is a highest temperature among a plurality of indoor rooms, and the temperature of the second indoor room is a lowest temperature among the plurality of the indoor rooms.

7. The method of claim 1, wherein the supplying internal air from the first indoor room to the second indoor room includes
   determining a temperature of the first indoor room,
   determining a target temperature of the second indoor room, and
   transferring the internal air from the first indoor room to the second indoor room based on the determined temperature of the first indoor room and the target temperature of the second indoor room.

8. The method of claim 7, wherein, during a cooling mode, supplying the internal air from the first indoor room to the second indoor room when the temperature of the first indoor room is lower than the target temperature of the second indoor room.

9. The method of claim 7, wherein, during a heating mode, supplying internal air from the first indoor room to the second indoor room when the temperature of the first indoor room is higher than the target temperature of the second indoor room.

10. The method of claim 1, further comprising determining whether a degree of air quality in the first indoor room is outside a predetermined range, and
supplying external ambient air to the first indoor room if the degree of air quality is outside the predetermined range.

11. The method of claim 10, wherein determining the degree of air quality in the first indoor room includes determining whether an amount of humidity in the internal air is above a predetermined level.

12. The method of claim 10, wherein determining the degree of air quality in the first indoor room includes determining whether an amount of $CO_2$ in the internal air is above a predetermined level.

13. The method of claim 1, further comprising:
exhausting an internal air of the second indoor room to an outside of a building to control a temperature of the second indoor room that receives the internal air of the first indoor room.

14. The method of claim 1, further comprising stopping the supplying of air from the first indoor room to the second indoor room when a stop air exchange command is inputted by a user.

15. The method of claim 1, further comprising
sensing a temperature of the first indoor room and the second indoor room, and
calculating an average temperature of the first and second indoor rooms, wherein
during a cooling mode, supplying the internal air of the first indoor room to the second indoor room when a temperature of the first indoor room is lower than the average temperature and a temperature of the second indoor room is higher than the average temperature, and
during a heating mode, supplying the internal air of the first indoor room to the second indoor room when the temperature of the first indoor room is higher than the average temperature and the temperature of the second indoor room is lower than the average temperature.

16. The method of claim 15, further comprising
exhausting an internal air from the first indoor room to an outside of a building, and
during a cooling mode, reducing a rate of air exhausted from the first indoor room if the temperature of the second indoor room is higher than the average temperature, and
during a heating mode, reducing the rate of air exhausted from the first indoor room if the temperature of the second indoor room is lower than the average temperature.

17. The method of claim 1, wherein the determining the electric power rate information includes determining a peak cost of electric power.

18. The method of claim 1, wherein in the cooling mode, adjusting the user set temperature includes setting a target temperature to be higher than the user set temperature.

19. The method of claim 1, wherein in the heating mode, adjusting the user set temperature includes setting a target temperature to be lower than the user set temperature.

20. The method of claim 1, wherein, if the current power rate is at a fourth level, sensing the temperature in a plurality of indoor rooms that includes the first and second indoor rooms and calculating an average temperature based on the sensed temperatures, wherein
during a cooling mode, supplying the internal air from the first indoor room to the second indoor room, wherein the first indoor room has a lower temperature than the average temperature and the second indoor room has a higher temperature than the average temperature, and
during a heating mode, supplying the internal air of the first indoor room to the second indoor room, wherein the first indoor room has a higher temperature than the average temperature and the second indoor room has a lower temperature than the average temperature.

21. The method of claim 20, wherein the air conditioner includes a compressor, an outdoor unit, a plurality of indoor units, and a ventilation system, and wherein
when the current power rate is at the fourth level, reducing a power consumption rate of the air conditioner by shutting down the compressor, the outdoor unit, or the plurality of indoor units, while operating the ventilation system to supply the internal air from the first indoor room to the second indoor room.

* * * * *